Figure 1:
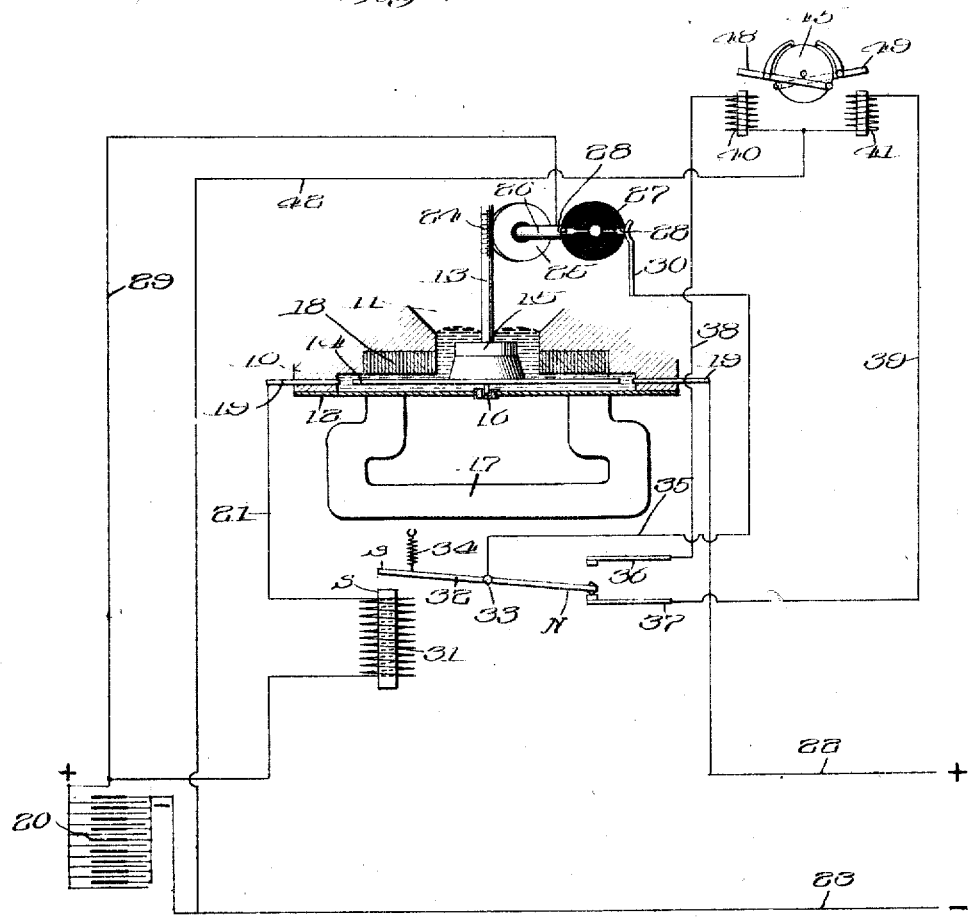

R. C. LANPHIER.
RECORDING MECHANISM FOR METERS.
APPLICATION FILED MAR. 22, 1911.

998,016.

Patented July 18, 1911.
2 SHEETS—SHEET 1.

R. C. LANPHIER.
RECORDING MECHANISM FOR METERS.
APPLICATION FILED MAR. 22, 1911.

998,016.

Patented July 18, 1911.

2 SHEETS—SHEET 2.

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

RECORDING MECHANISM FOR METERS.

998,016.  Specification of Letters Patent.  Patented July 18, 1911.

Application filed March 22, 1911. Serial No. 616,202.

*To all whom it may concern:*

Be it known that I, ROBERT C. LANPHIER, a citizen of the United States, residing at Springfield, county of Sangamon, State of Illinois, have invented certain new and useful Improvements in Recording Mechanism for Meters, of which the following is a specification, reference being had to the accompanying drawings.
This invention relates to recording mechanisms for meters and has for its object to provide a new and improved construction and arrangement of parts by which the indicating hands may be operated at a distance from a meter instead of being driven directly by gearing from the rotating element or other moving part of the meter.

My invention is particularly intended for use with electric integrating meters, and in the form shown is especially adapted for use in connection with storage batteries on electric vehicles, electric lighted cars, and the like.

It has for a special object in this construction to provide that the distant-operated indicating hand shall turn more rapidly in proportion to the current passing on the discharge of the storage battery than it does on charge to compensate for the loss in the storage battery. The mechanism may be arranged as desired to have the indicator show the true amount of current used for charging the battery or to show the true amount of current passed during the discharge of the battery. In either event, the indicating hand is moved around the dial in one direction as the battery is charged, and then moved relatively faster in the reverse direction by the passage of the current in the reverse direction through the meter on the discharge of the battery. The means by which I have accomplished this object are illustrated in the drawings and hereinafter specifically described.
That which I believe to be new is set forth in the claims.

Figure 2:
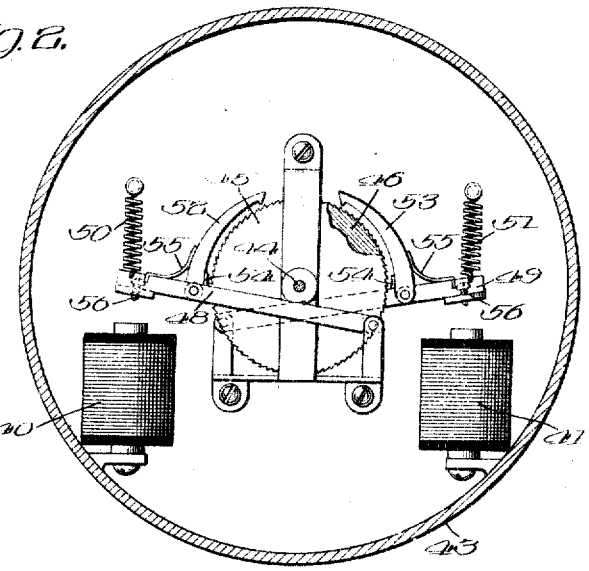
Figure 3:
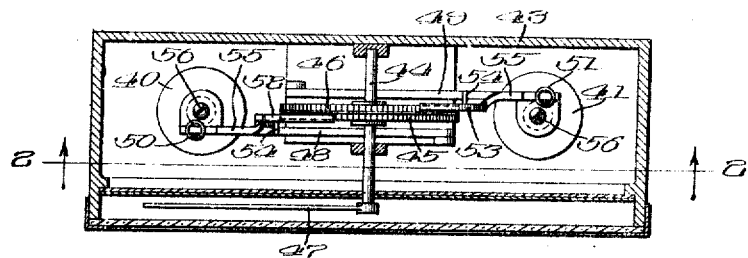

In the drawings,—Figure 1 is a diagrammatic view of my improved apparatus. Fig. 2 is an enlarged detail of the mechanism by which the movement of the indicating hand is directly caused, being a cross-section taken on line 2—2 of Fig. 3. Fig. 3 is a top or plan view, partly in section, of the parts shown in Fig. 2.
Referring to the several figures of the drawings, in which corresponding parts are indicated by the same reference characters,—10 indicates a casing of a meter, inclosing a mercury chamber 11 closed at the bottom by a plate 12.
13 indicates a spindle bearing an armature 14 and a float 15 which is adapted to buoy up the spindle and its connected parts in the mercury in the chamber 11.

16 indicates a guide carried by the bottom-plate 12 in which the lower end of the spindle 13 is adapted to work.

17 indicates a permanent magnet of any appropriate type having its poles in close proximity to the armature 14, and 18 indicates a return plate in the form of a ring located directly above and only a short distance from the poles of the magnet 17.

19 indicates contacts extending into the mercury chamber 11 at opposite sides of the armature 14.

20 indicates a storage battery the positive side of which is connected to one of the contacts 19 by a wire 21.

22 indicates a circuit wire connected at one end to the other of the contacts 19, and 23 indicates a circuit wire connected at one end to the negative side of the storage battery. The wires 22—23 are adapted to be connected respectively to the positive and negative sides of a generator for the purpose of charging the battery 20, as will be readily understood, or to be connected to the load circuit for the discharge of the battery, the rate of rotation of the armature 14 being in either case a measure of the amount of current passing.

24 indicates a worm cut on the spindle 13, meshing with which is a worm-gear 25 mounted on a shaft 26 supported in any appropriate manner in the framework of the meter. By this means, when the spindle 13 is rotated the shaft 26 is given a corresponding rotation.

27 indicates a disk of insulating material mounted on the shaft 26.

28 indicates contacts carried by the disk 27 and connected electrically with the shaft 26 which is connected by a wire 29 with the battery 20, or with any other suitable source of electrical power.

30 indicates a brush bearing on the edge of the disk 27, connected in the manner hereinafter described with the battery or other suitable source of electrical power in circuit with the wire 29. By this means, as will be readily understood, as the shaft 26 and disk 27 rotate slowly, a current is sent intermittently through the circuit comprising the wire 29 and the brush 30, the frequency of the passage of the current depending entirely upon the rapidity of the rotation of the armature 14, or, in other words, depending upon the strength of the current passing through the meter.

31 indicates an electro-magnet, the coil of which is, in the construction shown, connected in series with the circuit through the meter between the positive side of the battery and the meter. It will thus be seen that when the battery is being discharged the upper end of the magnet 31 is the south pole, and that when the battery is being charged with the current passing through the coil in the opposite direction the upper end of the magnet becomes the north pole. The drawings represent the conditions when the battery is being discharged.

32 indicates a polarized arm pivoted at 33 in any suitable manner, the left-hand end of which as shown in Fig. 1 is a south pole.

34 indicates a coiled spring tending to hold the end of the arm to which it is attached yieldingly away from the magnet 31.

35 indicates a wire connecting the arm 32 with the brush 30.

36—37 indicate contacts between which the right-hand end of the arm 32 as shown in Fig. 1 is adapted to be swung.

38—39 indicate wires connecting the contacts 36—37, respectively, with electro-magnets 40—41 which are connected by a wire 42 with the storage battery 20, thus completing the circuit through the wire 29 and brush 30 as before described, the circuit being through the wire 38 or 39 in accordance with the position of the arm 32, as will be readily understood.

Referring now to Figs. 2 and 3 where the magnets 40—41 and their coöperating parts are shown in detail, 43 indicates a casing in which the magnets 40—41 are suitably mounted. 44 indicates a shaft journaled in said casing 43, keyed or otherwise non-rotatably mounted on which are two ratchet-wheels 45—46. 47 indicates an indicating hand mounted on the end of said shaft 44. 48—49 indicate arms pivotally mounted in the casing 43 adapted to be attracted by the magnets 40—41, respectively, when energized intermittently by the completion of the circuit therethrough. 50—51 indicate coiled springs tending to hold said arms 48—49, respectively, yieldingly against downward swinging on their pivots. 52—53 indicate hooked dogs pivotally mounted on the arms 48—49, respectively, adapted normally to stand opposite the ratchet-wheels 45—46, respectively, but slightly out of contact therewith, but being adapted to engage the teeth of said ratchet-wheels to cause rotation of the shaft 44 as said arms are swung downward. 54 indicates a stop carried by each of the arms 48—49 to limit properly the swinging of the dogs toward the ratchet-wheels, and 55 indicates springs mounted on the arms 48—49 adapted to hold the dogs 52—53 yieldingly against the stops 54. 56 indicates set-screws mounted in the ends of the arms 48—49, adapted to limit the downward stroke of said arms. As shown in Fig. 2, the arm 48 is to be given a slightly shorter stroke than the arm 49 whereby a stroke of the arm 49 rotates the shaft 44 in one direction farther than a stroke of the arm 48 rotates said shaft in the opposite direction. This can of course be regulated readily by the adjustment of the set-screws 56.

With the wires 22—23 connected up with a load circuit, a current flows through the meter causing a rotation of the armature 14 and a corresponding rotation of the shaft 26. At intervals, depending upon the rate of rotation of said shaft, a current is sent through the wire 29, the brush 30, wire 38, arm 32, contact 37, wire 39, magnet 41 and wire 42, each momentary current causing a stroke of the arm 49 and a slight rotation of the shaft 44 in a clockwise direction, swinging the hand 47 in one direction around the dial. As before described, in the construction shown the hand 47 is designed to be thus moved around the dial to indicate when the battery 20 has reached a substantially discharged condition, at which time the wires 22—23 are to be disconnected from the load circuit and connected in due time with any suitable source of electrical power, the wire 22 being connected with the positive side. When a current begins then to flow through the meter circuit and consequently through the coil of the magnet 31, the upper end of the magnet becomes a north pole, whereupon it attracts the arm 32, bringing the arm into engagement with the contact 36. Thereafter upon the rotation of the armature and of the shaft 26, the intermittent currents through the circuit 29—42 are directed through the wire 38 and magnet 40, each momentary current causing a stroke of the arm 48 and a slight rotation of the shaft 44 in a counter-clockwise direction, swinging the hand 47 to indicate the amount of current that has passed.

While I have shown a construction by which the throw of the arms 48—49 is adjustable by means of the set-screws 56, I do not limit myself to that construction except as hereinafter specifically claimed. Indeed, I do not limit the broader claims at all to an adjustable throw of the arms 48—49, or their equivalents, since any appropriate means may be used without departing from my invention for causing the indicating hand to travel farther over the scale in one direction for a stroke of one arm than said hand travels over the scale in the opposite direction for a stroke of the other arm.

What I claim as my invention and desire to secure by Letters Patent is,—

1. The combination of an electric meter, an electric circuit, a make-and-break mechanism in said circuit operated by said meter, an indicating hand, means actuated intermittently by the successive currents through said circuit to move said indicating hand, and means actuated intermittently by the successive currents through said circuit to move said indicating hand in the opposite direction at a greater speed relative to the current when the current passes in the opposite direction through said meter.

2. The combination of an electric meter, an electric circuit part of which is double so that the current may be directed through either one of the two branches, a make-and-break mechanism in said circuit operated by said meter, a switch adapted to complete the circuit through one or the other of said branches in accordance with the direction of the current through said meter, an indicating hand, means intermittently actuated by the current through one of said branches to move said indicating hand, and means intermittently actuated by the current through the other of said branches to move said indicating hand in the opposite direction.

3. The combination of an electric meter, an electric circuit part of which is double so that the current may be directed through either one of the two branches, a make-and-break mechanism in said circuit adapted to be operated by said meter, a switch adapted to complete the circuit through one or the other of said branches in accordance with the direction of the current through said meter, an indicating hand, means intermittently actuated by the current through one of said branches to move said indicating hand, and means intermittently actuated by the current through the other of said branches to move said indicating hand in the opposite direction at a greater speed relative to the strength of the current passing through the meter.

4. The combination of an electric meter, an electric circuit part of which is double so that the current may be directed through either one of the two branches, a make-and-break mechanism in said circuit operated by said meter, a polarized switch adapted to complete the circuit through either of said branches, an electro-magnet adapted to attract or repel said switch to cause it to complete the circuit through one or the other of said branches in accordance with the direction of the current therethrough, means intermittently actuated by the current through one of said branches to move said indicating hand, and means intermittently actuated by the current through the other of said branches to move said indicating hand in the opposite direction.

5. The combination of a storage battery, an electric meter, a circuit connecting said battery and said meter, a second electric circuit part of which is double so that the current may be directed through either one of the two branches, a make-and-break mechanism in said second circuit operated by said meter, a polarized switch adapted to complete the circuit through either of said branches, an electro-magnet energized by current passing through the meter circuit, said magnet being adapted to attract or repel said polarized switch to cause it to complete the circuit through one or the other of said branches in accordance with the direction of the current therethrough, means intermittently actuated by the current through one of said branches to move said indicating hand, and means intermittently actuated by the current through the other of said branches to move said indicating hand in the opposite direction.

6. The combination of an electric meter, an electric circuit part of which is double so that the current may be directed through either one of the two branches, a make-and-break mechanism in said circuit operated by said meter, a switch adapted to complete the circuit through one or the other of said branches in accordance with the direction of the current through said meter, two arms, an indicating hand adapted to be moved in one direction by a movement of one arm and to be moved in the opposite direction by a movement of the other arm, and an electro-magnet in each of the branches of said circuit, each of which magnets is adapted to attract and move one of said arms.

7. The combination of an electric meter, an electric circuit part of which is double so that the current may be directed through either one of the two branches, a make-and-break mechanism in said circuit operated by said meter, a switch adapted to complete the circuit through one or the other of said branches in accordance with the direction of the current through said meter, two arms, an indicating hand adapted to be moved in one direction by a movement of one arm and to be moved in the opposite direction by a movement of the other arm, an electro-magnet in each of the branches of said circuit, each of which magnets is adapted to attract and move one of said arms, and means for varying the amount of the movement of said indicating hand produced by a full stroke of one of said arms.

8. The combination of an electric meter, an electric circuit part of which is double so that the current may be directed through either one of the two branches, a make-and-break mechanism in said circuit operated by said meter, a switch adapted to complete the circuit through one or the other of said branches in accordance with the direction of the current through said meter, two arms, an indicating hand adapted to be moved in one direction by a movement of one arm and to be moved in the opposite direction by a movement of the other arm, an electromagnet in each of the branches of said circuit, each of which magnets is adapted to attract and move one of said arms, and means for varying the length of the stroke of one of said arms.

9. The combination of an electric meter, an electric circuit part of which is double so that the current may be directed through either one of the two branches, a make-and-break mechanism in said circuit operated by said meter, a switch adapted to complete the circuit through one or the other of said branches in accordance with the direction of the current through said meter, a revolubly-mounted shaft, an indicating hand mounted thereon, two ratchet-wheels mounted on said shaft, an arm pivotally mounted adjacent to each ratchet-wheel, a dog pivotally mounted on each arm adapted to stand normally out of engagement with the adjacent ratchet-wheel but adapted to engage the same upon a downward stroke of its arm, an electromagnet in each of the branches of said circuit, each of which magnets is adapted to attract and move downward one of said arms, and means for varying the amount of movement of said shaft produced by a full stroke of one of said arms.

ROBERT C. LANPHIER.

Witnesses:
JACOB BUNN,
GEORGE A. BATES.